United States Patent
Cudak et al.

(10) Patent No.: US 9,413,948 B2
(45) Date of Patent: Aug. 9, 2016

(54) SYSTEMS AND METHODS FOR RECOMMENDING IMAGE CAPTURE SETTINGS BASED ON A GEOGRAPHIC LOCATION

(71) Applicant: Lenovo Enterprise Solutions (Singapore) PTE. LTD., Singapore (SG)

(72) Inventors: Gary D. Cudak, Wake Forest, NC (US); Christopher J. Hardee, Raleigh, NC (US); Sarbajit K. Rakshit, Kolkata (IN)

(73) Assignee: LENOVO ENTERPRISE SOLUTIONS (SINGAPORE) PTE. LTD., Serangoon Garden (SG)

( * ) Notice: Subject to any disclaimer, the term of this patent is extended or adjusted under 35 U.S.C. 154(b) by 36 days.

(21) Appl. No.: 14/250,446

(22) Filed: Apr. 11, 2014

(65) Prior Publication Data
US 2015/0296134 A1    Oct. 15, 2015

(51) Int. Cl.
*H04N 5/232* (2006.01)
*H04N 5/33* (2006.01)

(52) U.S. Cl.
CPC ....... *H04N 5/23222* (2013.01); *H04N 5/23206* (2013.01); *H04N 5/23293* (2013.01); *H04N 5/33* (2013.01); *H04N 5/23216* (2013.01)

(58) Field of Classification Search
CPC .. H04N 5/23222; H04N 5/23293; H04N 5/33
USPC ..................................................... 348/207.1
See application file for complete search history.

(56) References Cited

U.S. PATENT DOCUMENTS

| | | | |
|---|---|---|---|
| 8,412,031 B2 | 4/2013 | Teshima | |
| 8,417,054 B2 | 4/2013 | Farrer et al. | |
| 2004/0174434 A1* | 9/2004 | Walker et al. | 348/211.3 |
| 2011/0050909 A1* | 3/2011 | Ellenby et al. | 348/207.1 |
| 2012/0099012 A1 | 4/2012 | Ryu et al. | |
| 2012/0321131 A1* | 12/2012 | Kobayashi | 382/103 |
| 2013/0188061 A1 | 7/2013 | Ellenby et al. | |
| 2013/0258117 A1* | 10/2013 | Penov et al. | 348/207.1 |
| 2013/0346523 A1* | 12/2013 | Praun et al. | 709/206 |
| 2014/0049652 A1* | 2/2014 | Moon | H04N 9/8233 348/207.1 |

FOREIGN PATENT DOCUMENTS

EP    0649017 A2    6/1995

OTHER PUBLICATIONS

Press release for CanonEOS Rebel T31 Camera; Lake Success, NY, Feb. 7, 2011; Canon USA, Inc.; last accessed Feb. 21, 2014 @ https://www.usa.canon.com/cusa/about_canon?pageKeyCode=pressreldetail&docId=0901e0248028433f.

(Continued)

*Primary Examiner* — Gevell Selby
(74) *Attorney, Agent, or Firm* — Olive Law Group, PLLC (57) ABSTRACT

Systems and methods for recommending image capture settings based on a geographic location are disclosed. According to an aspect, a method may include determining a geographic location of the electronic device. The method may also include determining a recommended image capture setting based on the geographic location. Further, the method may include configuring the electronic device to capture an image based on the recommended image capture setting.

12 Claims, 5 Drawing Sheets

(56) References Cited

OTHER PUBLICATIONS

Forum thread for Automatic Camera Setting Different from dpreview.com comparison; Digital Photography Review; last accessed Feb. 21, 2014 @ http://www.dpreview.com/forums/thread/54250.

Forum thread for Automatic Camera Setting Different from dpreview.com comparison; Digital Photography Review; started Jan. 5, 2001; last accessed Feb. 21, 2014 @ http://www.dpreview.com/forums/thread/54250.

* cited by examiner

SYSTEMS AND METHODS FOR RECOMMENDING IMAGE CAPTURE SETTINGS BASED ON A GEOGRAPHIC LOCATION

TECHNICAL FIELD

The present invention is related to electronic devices for capturing images, and more specifically, to systems and methods for recommending image capture settings based on a geographic location.

BACKGROUND

Many electronic devices, such as mobile telephones, have image capture devices capable of capturing images or video. Users of these electronic devices can capture images or video, and subsequently share the captured images or video with others via a social network. These images are typically shared with or recommend to other users on the social network. For example, a user may recommend an image another user shared of the Eiffel Tower of Paris, France. The recommendation may take form of a "like," star, heart, or the like.

However, if the user was to visit the Eiffel Tower, the user may wish to capture images similar to the images shared or recommended to the user on the social network. Some social networks enable users to display image capture settings used to capture images on their electronic devices. Such image capture settings may be, for example, exposure, white balance, shutter speed, or other similar settings. Simply displaying this information may be useful for experienced photographers, but novice photographers may not be aware of how to alter the image capture settings on their electronic devices.

For at least this reason, there is a need for improved techniques for recommending image capture settings to other users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are a system and method for recommending image capture settings for a geographic location to an electronic device configured to capture images. According to an aspect, a method may include determining a geographic location of the electronic device. The method may also include determining a recommended image capture setting based on the geographic location. Further, the method may include configuring the electronic device to capture an image based on the recommended image capture setting.

According to another aspect, a method may include capturing an image using an image capture device. The method may include determining a geographic location of the image capture device during capture of the image. The method may also include determining an image capture setting used by the image capture device for capturing the image. The method may also include receiving a recommendation to use the image capture setting for the geographic location. Further, the method may include communicating the recommended image capture setting to a computing device.

According to another aspect, a method may include predicting a geographic location of an electronic device. The method may include determining a recommended image capture setting based on the predicted geographic location. The method may also include determining whether a current geographic location of the electronic device is substantially similar to the predicted geographic location. Further, the method may include configuring the electronic device to capture an image using the recommended image capture setting in response to determining the current geographic location is substantially similar to the predicted geographic location.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "electronic device" should be broadly construed. It can include any type of computing device, for example, a smartphone, a mobile telephone, a personal digital assistant (PDA), a mobile computer with a smart phone client, or the like. An electronic device can also include any type of conventional computer, for example, tablet computer or a notebook computer. An electronic device may include an image capture device configured to capture images on the electronic device. The image capture device may be camera attached to or embedded in the electronic device. For example, the image capture device may capture an image in response to a user interacting with a user interface of the electronic device.

As referred to herein, a "user interface" is generally a system by which users interact with an electronic device. A user interface can include an input for allowing users to manipulate an electronic device, and can include an output, such as, but not limited to, a display, for allowing the electronic device to present information and/or data, indicate the effects of the user's manipulation, etc. The display may comprise a touchscreen display for enabling the input of information and the output of information. An example of a user interface on an electronic device includes a graphical user interface (GUI) that allows users to interact with programs in more ways than typing.

Figure 1:
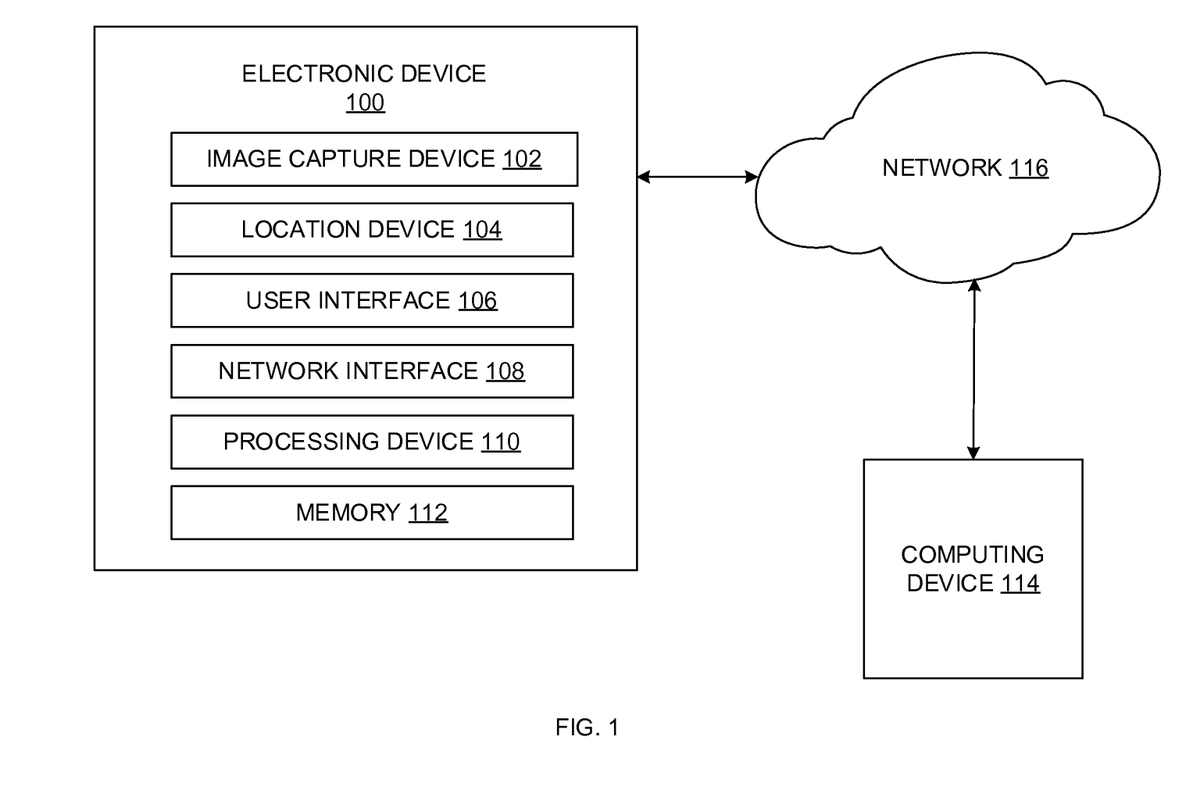
FIG. 1 is a block diagram of an example system for recommending an image capture setting for a geographic location to an electronic device configured to capture images in accordance with embodiments of the present invention.

The present invention is now described in more detail. For example, FIG. 1 illustrates a system for recommending an image capture setting based on a geographic location in accordance with embodiments of the present invention. Referring to FIG. 1, an electronic device 100 comprises an image capture device 102 configured to capture images and video. For example, the image capture device 102 may be a camera operatively connected to, integrated with, embedded, or otherwise operable to capture images and/or video and to provide the images and/or video to the electronic device 100. The image capture device 102 may be configured to capture images utilizing image capture settings that can be adjusted either manually by a user or automatically for producing a desired image result. For example, an image capture setting may be, but not limited to, a focal length, aperture, exposure, zoom, flash, white balance, resolution, file size, filter, shutter speed, a preset setting adjustable by the image capture device 102, or the like.

The electronic device 100 includes a location device 104 configured to determine a geographic location of the electronic device 100. In accordance with embodiments of the present invention, the location device 104 may comprise a GPS unit capable of determining the GPS coordinates for the electronic device 104. In other embodiments, the location device 104 may be configured to determine the geographic location via triangulation or other suitable techniques of location determination available to mobile electronic devices.

The electronic device 100 may include a user interface 106. In accordance with embodiments of the present invention, the user interface 106 may comprise a graphical user interface (GUI) that enables a user of the electronic device 100 to interact and communicate with components 102-112 of the electronic device 100. For example, the user interface 106 may comprise a touchscreen display comprising a GUI enabling the user of the electronic device 100 to make selections on and input information into the electronic device 100. The input and selections may be used to control the components of the electronic device 100. Further, the user interface 106 may include a display for displaying captured images and for displaying other data or images.

The electronic device 100 may include a network interface 108 configured to enable the electronic device 100 to communicate with another computing device 114 via a network 116. In accordance with embodiments of the present invention, network interface 108 may configured to provide access to a number of known network types to enable electronic device 100 and computing device 114 to communicate. For example, network interface 108 may be comprise a cellular transceiver, WI-FI® transceiver, LAN transceiver, or the like depending upon the type of access technology utilized by network 116. The electronic device may include hardware, software, firmware, or combinations thereof for implementing functions disclosed herein. For example, the electronic device 100 may include a processor 110 and memory 112, as shown in FIG. 1, which may be configured to store and execute computer readable program instructions to control components 102-108 to carry out functionality of the present invention.

Figure 2:
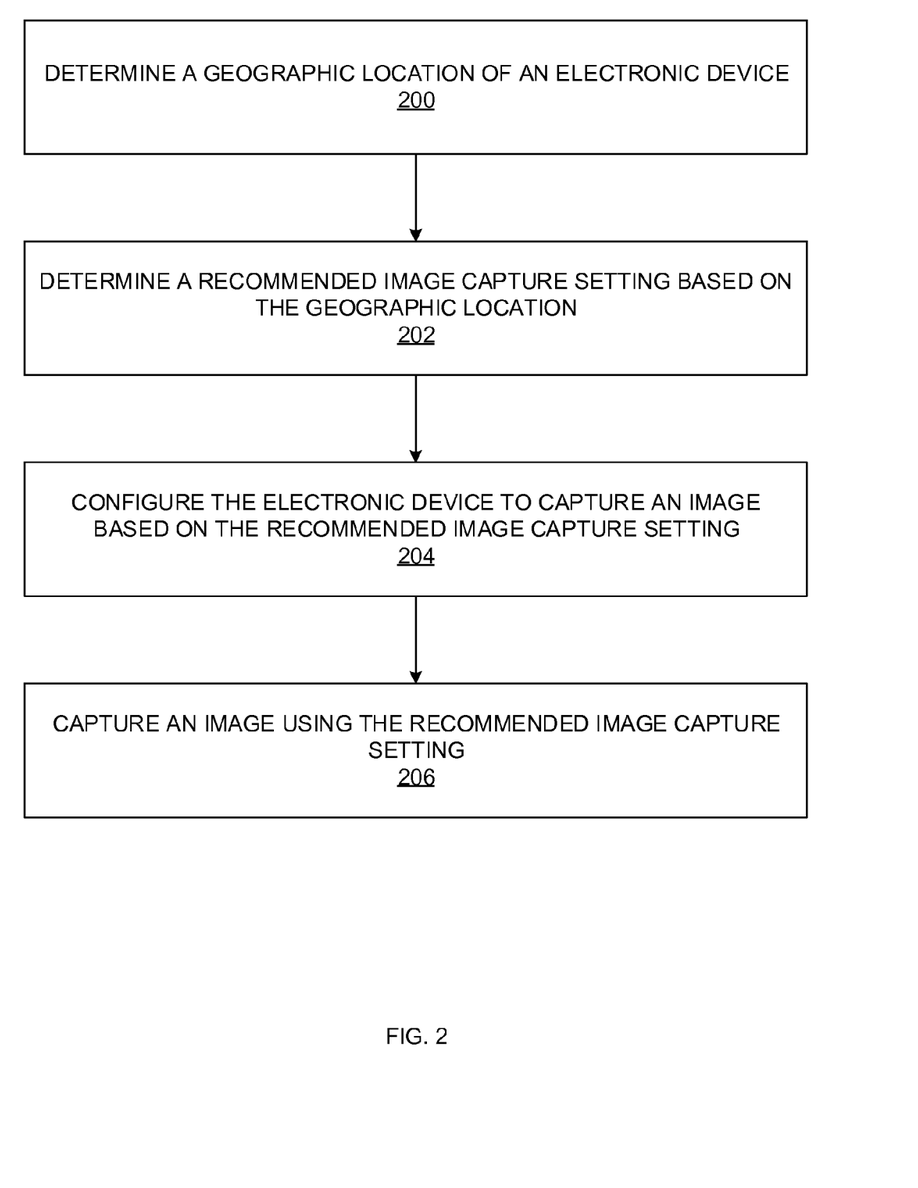
FIG. 2 is a flowchart of an example method for determining a recommended image capture setting for a geographic location for an electronic device configured to capture images in accordance with embodiments of the present invention.

FIG. 2 illustrates a flowchart of an example method for determining a recommended image capture setting for a geographic location of an electronic device configured to capture images in accordance with embodiments of the present invention. Referring to FIG. 1, the method includes determining 200 a geographic location of an electronic device. For example, location device 104 may determine GPS coordinates of the electronic device 100. In another example, location device 104 may determine the location of the electronic device 100 using triangulation or other suitable methods of location determination for mobile electronic devices.

In accordance with embodiments of the present invention, the location device 104 may receive an input of the geographic location of the electronic device 100. For example, the user of the electronic device 100 may input the geographic location, such as, but not limited to, a physical address via the user interface 106. The location device 102 may then associate the physical address with the geographic location of the electronic device 100. In another example, the user interface 106 may receive an input, such as, but not limited to, a landmark name associated with a physical address. The location device 104 may then determine the physical address associated with the landmark name. The determined physical address may then be associated with the geographic location of the electronic device 100 by the location device 104.

Figure 3:
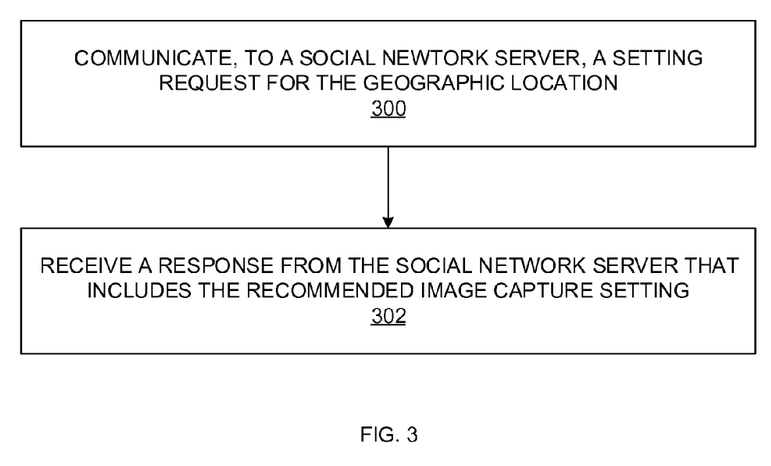
FIG. 3 is a flowchart of an example method for communicating a setting request to a social network server for the geographic location in accordance with embodiments of the present invention.

The method of FIG. 2 includes determining 202 a recommended image capture setting based on the geographic location. In embodiments, determining 202 may comprise, as illustrated in FIG. 3, communicating 300, to a social network server, a setting request for the geographic location. For example, computing device 114 may comprise a social network server, either hosting or providing access to, a social network. Such a social network may enable users accessing the social network to upload and share images with other users of the social network. Shared images may be associated with a geographic location that along with the image capture settings used to capture the image. The social network may also enable the users to recommend image capture settings for a geographic location to other users on the social network.

In accordance with embodiments, the function of determining 202 a recommended image capture setting may include determining a feature set of the electronic device. The setting request may include the determined feature set of the electronic device. For example, a feature set of electronic device 100 may comprise features of image capture device 102, such as, but not limited, to a focal length range, available white balance settings, aperture range, zoom range, flash capabilities, image resolutions available, and shutter speed ranges. Including the feature set of electronic device 100 in the setting request may ensure the recommend image capture setting will be compatible with the features of image capture device 102.

FIG. 3 further illustrates that determining 202 may also include receiving 302 a response from the social network server that includes the recommended image capture setting. For example, the recommended image capture setting may be at least one of a focal length, aperture, exposure, zoom, flash, white balance, resolution, file size, filter, shutter speed, and/or a preset setting adjustable by the image capture device 102 of electronic device 100.

Figure 4:
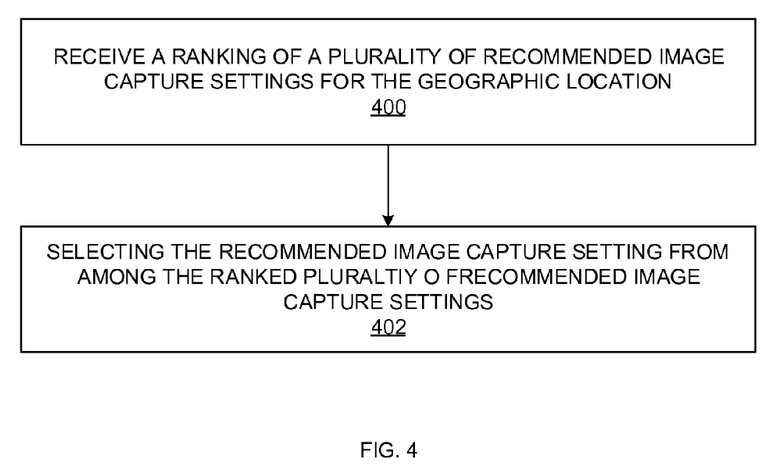
FIG. 4 is a flowchart of an example method for receiving a ranking of a plurality of recommended image capture settings for the geographic location in accordance with embodiments of the present invention.

FIG. 4 illustrates, determining 202 may also comprise receiving 400 a ranking of a plurality of recommended image capture settings for the geographic location. For example, the response from computing device 114 may comprise a ranking of a plurality of recommended image capture settings for the geographic location. In accordance with embodiments, the ranking may be based on user feedback associated with each of the plurality of recommended image capture settings. For example, the user feedback may provide an indication how much users appreciated captured images when using the recommended image capture settings at the geographic location. In other embodiments, the ranking may be based on the determined feature set of the electronic device. For example, the ranking may provide an indication of how compatible each of the plurality of recommended image capture settings are for the electronic device 100. In other embodiments, the ranking may be based on both user feedback associated with each of the plurality of recommended image capture settings and the determined feature set of the electronic device.

Returning to FIG. 2, the method includes configuring 204 the electronic device to capture an image based on the recommended image capture setting. For example, the image capture device 102 of the electronic device 100 may alter a focal length setting, aperture setting, exposure setting, zoom setting, flash setting, white balance setting, resolution setting, file size setting, filter setting, shutter speed setting, a preset setting using the recommended image capture setting for the geographic location, and/or the like.

The method of FIG. 2 includes capturing 206 an image using the recommended image capture setting. In the example of a user visiting the Eiffel Tower, the user of the electronic device 100 may capture an image of the Eiffel tower using image capture device 102 configured to capture images using the recommend image capture setting recommended received from the social network hosted by computing device 114 for the geographic location associated with the Eiffel Tower.

Figure 5:
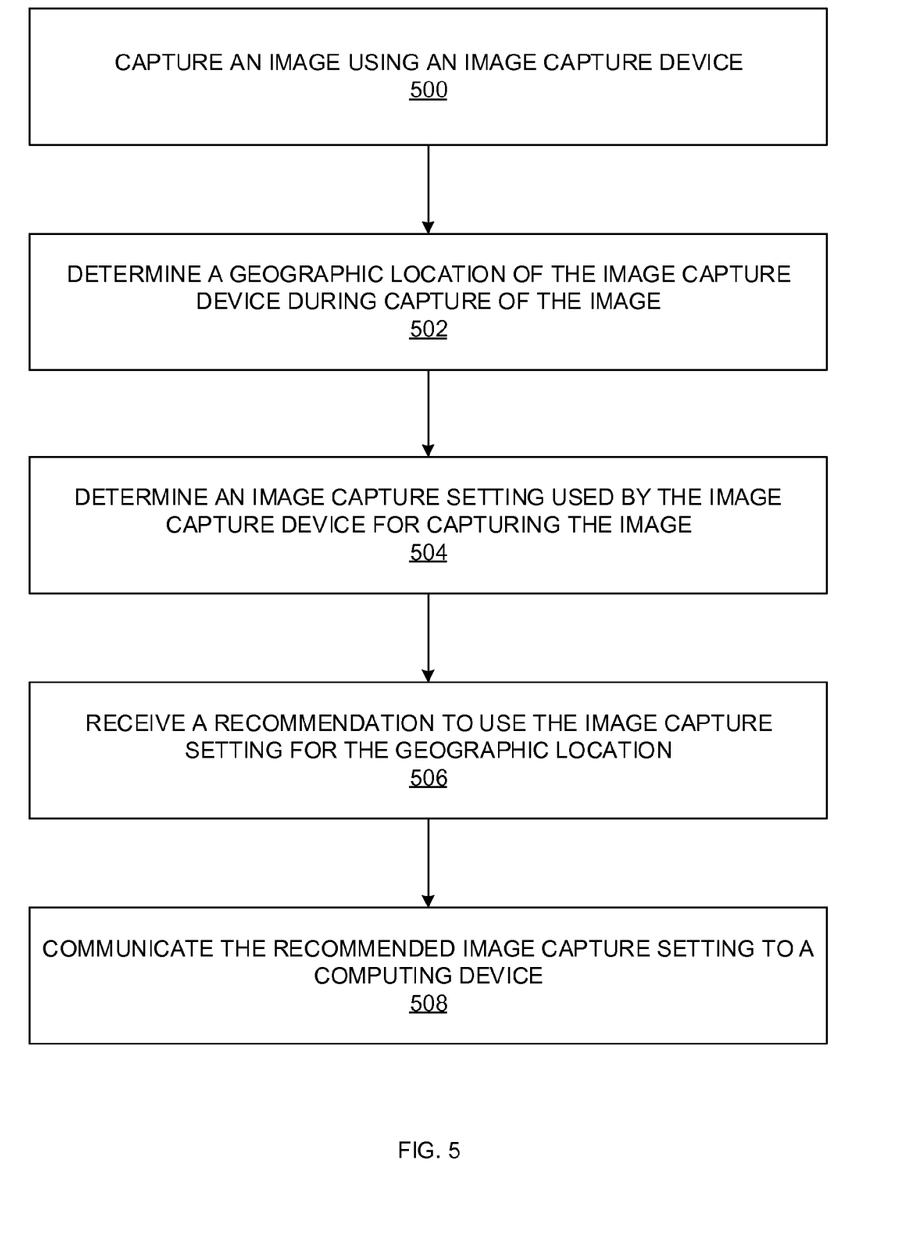
FIG. 5 is a flowchart of an example method for communicating a recommended image capture setting to a computing device in accordance with embodiments of the present invention.

In accordance with embodiments of the present invention, FIG. 5 illustrates a flowchart of an example method for communicating a recommended image capture setting to a computing device. Referring to FIG. 5, the method includes capturing 500 an image using an image capture device. For example, the electronic device 100 of FIG. 1 may capture an image using image capture device 102. Continuing the Eiffel Tower example, a user of electronic device 100 may interact with user interface 106 to capture an image of the Eiffel Tower using image capture device 102.

The method of FIG. 5 includes determining 502 a geographic location of the image capture device during capture of the image. For example, the electronic device 100 may utilize location device 104 to determine the location of electronic device 100 during capture of an image by image capture device 102. In the Eiffel Tower example, while a user of electronic device 100 captures an image of the Eiffel Tower with image capture device 102, the location device 104 may determine the location of the electronic device 100. As stated previously, in one embodiment, the location device 104 may determine the location using a GPS receiver or known triangulation methods for mobile electronic devices. In an alternative embodiment, the user of electronic device 100 may input the physical address or landmark name to designate the location of the electronic device 100. In the Eiffel Tower example, the user of electronic device 100 may interact with user interface 106 to enter the landmark name "Eiffel Tower."

The location device 104 may then determine a physical address associated with the landmark name "Eiffel Tower."

The method of FIG. 5 includes determining 504, an image capture setting used by the image capture device for capturing the image. In one embodiment, the electronic device 100 may determine an image capture setting used by image capture device 102 to capture an image by extracting metadata associated with the captured image. The metadata may include, but is not limited to, a focal length setting, aperture setting, exposure setting, zoom setting, flash setting, white balance setting, resolution setting, file size setting, filter setting, shutter speed setting, and/or a preset setting. The electronic device 100 may then store the metadata as the image capture setting for the captured image. Continuing the Eiffel Tower example, the electronic device 100 may store metadata of a captured image of the Eiffel Tower as an image capture setting for the geographic location associated with the Eiffel tower.

The method of FIG. 5 includes receiving 506 a recommendation to use the image capture setting for the geographic location. In one embodiment, the electronic device 100 may display to a user of electronic device 100 via user interface 106 a captured image. Continuing the Eiffel Tower example, the electronic device 100 may display a captured image of the Eiffel Tower via the user interface 106. The electronic device 100 may then receive an input, via user interface 106, from the user to recommend the image capture settings used to capture the image of the Eiffel Tower to a social network, such as, but not limited to, a social network hosted or accessible by computing device 114. In an alternative embodiment, the electronic device 100 may automatically recommend the image capture settings used to capture the image of the Eiffel Tower to the social network.

The method of FIG. 5 includes communicating 508 the recommended image capture setting to a computing device. In embodiments, the computing device may comprise a social network server either hosting or providing access to a social network. As described in previous examples, computing device 114 may be a social network server. Also described in previous examples, electronic device 100 may communicate with computing device 114 via network 116 by utilizing network interface 108. In the Eiffel Tower example, the electronic device 100 may communicate the recommend image capture setting to computing device 114. Subsequently, the computing device 114 may then upload or communicate the recommend image capture setting to the social network. The recommended image capture setting may include at least one of a focal length setting, aperture setting, exposure setting, zoom setting, flash setting, white balance setting, resolution setting, file size setting, filter setting, shutter speed setting, a preset setting, or the like.

Figure 6:
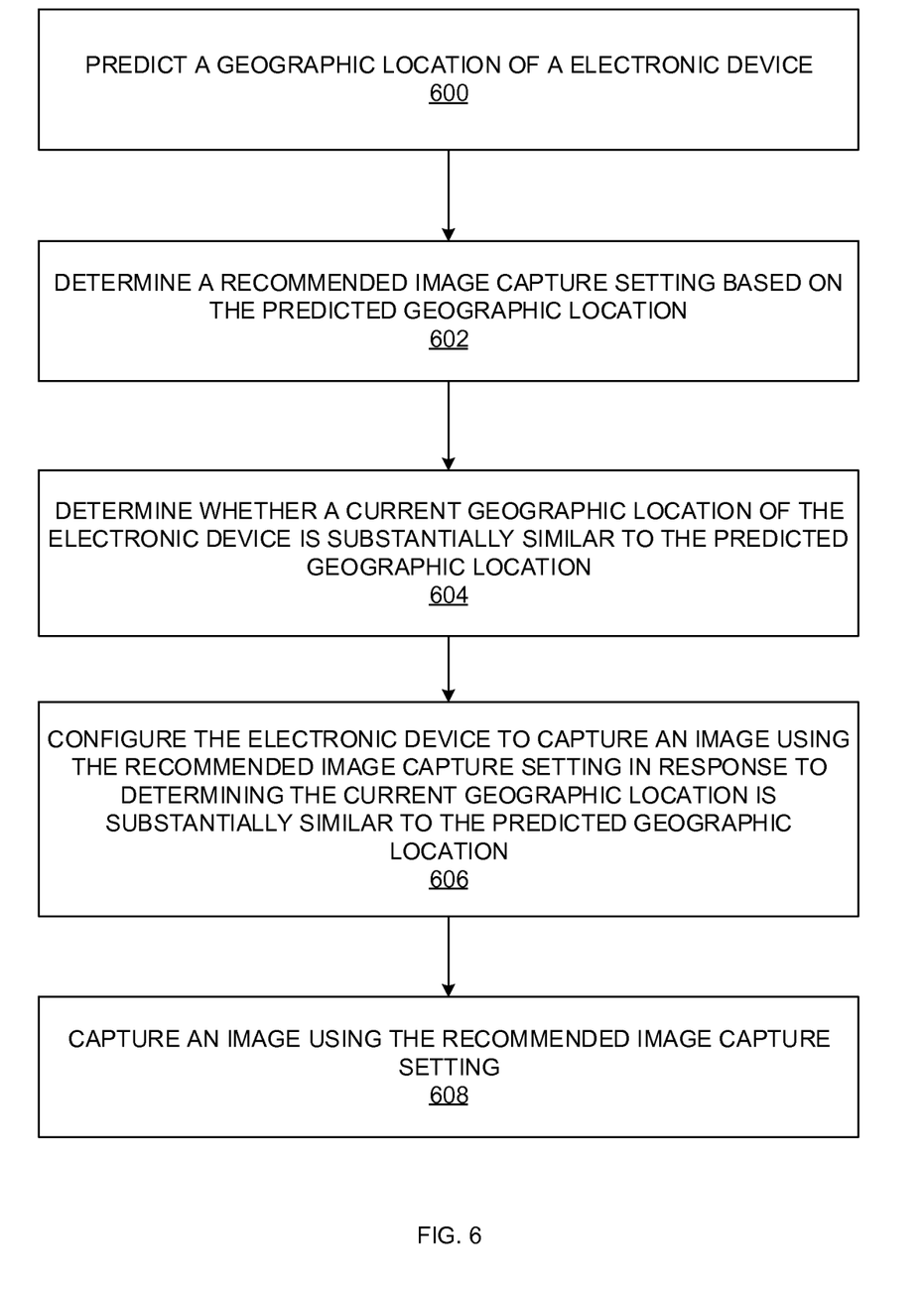
FIG. 6 is a flowchart of an example method for determining a recommended image capture setting for a predicted geographic location of an electronic device configured to capture images in accordance with embodiments of the present invention.

In accordance with embodiments of the present invention, FIG. 6 illustrates a flowchart of an example method for determining a recommended image capture setting for a predicted geographic location of an electronic device configured to capture images. Referring to FIG. 6, the method includes predicting 600 a geographic location of an electronic device. In embodiments, predicting 600 a geographic location of the electronic device may include determining a geographic location associated with an event of a calendar application. For example, the electronic device 100 of FIG. 1 may access a calendar application utilizing the processor 110 and memory 112 to determine a physical address or landmark name associated with an event of the calendar application. The processor 110 and/or memory 112 may control the communication of the physical address or landmark name to the location device 104 to determine the geographic location. The location device 104 may then associate the determined geographic location with the predicted geographic location of electronic device 100.

In other embodiments, the function of predicting 600 a geographic location of the electronic device may include determining a geographic location associated with a destination of a navigation application. For example, the electronic device 100 may utilize a navigation application to provide travel directions to a destination. The location device 104 may assist the navigation application in providing travel directions to the destination. The location device 104 may also determine the geographic location associated with the destination of the navigation application. The location device 104 may then associate the determined geographic location with the predicted geographic location of the electronic device 100. Continuing the Eiffel Tower example above, the electronic device 100 may utilize a navigation application accessible to the electronic device 100 to provide travel directions from an airport in Paris, France to the Eiffel Tower. The location device 104 may then determine a geographic location associated with the Eiffel Tower. The determined geographic location may then be associated with the predicted geographic location of the electronic device 100 by the location device 104.

The method of FIG. 6 includes determining 602 a recommended image capture setting based on the predicted geographic location. In embodiments, the function of determining 602 may include communicating, to a social network server, a setting request for the predicted geographic location. For example, electronic device 100 may communicate the setting request for the predicted geographic location to computing device 114. In other embodiments, the function of determining 602 a recommended image capture setting may also comprise determining a feature set of the electronic device. As described previously above in relation to FIG. 2, a feature set of electronic device 100 may comprise features of image capture device 102, such as, but not limited to, a focal length range, available white balance settings, aperture range, zoom range, flash capabilities, image resolutions available, shutter speed ranges, and/or the like. The setting request may also include the determined feature set of the electronic device. Including the feature set of electronic device 100 in the setting request may ensure the recommend image capture setting for the predicted geographic location will be compatible with the features of image capture device 102.

In embodiments, the function of determining 602 may also include receiving a response from the social network server that includes the recommended image capture setting for the predicted geographic location. For example, the recommended image capture setting may be at least one of a focal length, aperture, exposure, zoom, flash, white balance, resolution, file size, filter, shutter speed, and/or a preset setting adjustable by the image capture device 102 of electronic device 100.

In embodiments, the function of determining 602 may include receiving a ranking of a plurality of recommended image capture settings for the predicted geographic location. For example, the response from computing device 114 may comprise a ranking of a plurality of recommended image capture settings for the predicted geographic location. In one embodiment, the ranking may be based on user feedback associated with each of the plurality of recommended image capture settings. For example, the user feedback may provide an indication how much users appreciated captured images when using the recommended image capture settings at the predicted geographic location. In other embodiments, the ranking may be based on the determined feature set of the electronic device. For example, the ranking may provide an indication of how compatible each of the plurality of recommended image capture settings are for the electronic device 100. In other embodiments, the ranking may be based on both user feedback associated with each of the recommended image capture settings and the determined feature set of the electronic device.

The method of FIG. 6 includes determining 604 whether a current geographic location of the electronic device is substantially similar to the predicted geographic location. For example, the location device 102 may determine whether a current geographic location of the electronic device 100 is substantially similar to the predicted geographic location of electronic device 100. In embodiments, the function of determining 704 may comprise comparing the current GPS coordinates of the electronic device to GPS coordinates associated with the predicted geographic location. For example, the location device 102 may compare current GPS coordinates of the electronic device 100 to the predicted GPS coordinates. The location device 102 may determine the current GPS coordinates are substantially similar to the predicted GPS coordinates if they match. The location device 102 may also determine the current GPS coordinates are substantially similar if the current GPS coordinates and the predicted GPS coordinates are within a specified distance range. For example, the location device 102 may determine the current GPS coordinates are substantially similar to the predicted GPS coordinates are within a two mile radius of each other.

In other embodiments, the function of determining 604 may comprise comparing a physical address associated with the current geographic location of the electronic device with the physical address associated with the predicted geographic location. For example, the location device 102 may compare the physical address associated with the current geographic location of the electronic device 100 with the physical address associated with the predicted geographic location of the electronic device 100. The location device 102 may determine the current physical address is substantially similar to the predicted physical address if they match. The location device 102 may also determine the current physical address is substantially similar to the predicted physical address if the two addresses are within a specified distance range of each other. For example, the location device 102 may determine the current physical address is substantially similar to the predicted physical address if the two physical addresses are within a two mile radius of each other.

The method of FIG. 6 includes configuring 606 the electronic device to capture an image using the recommended image capture setting in response to determining the current geographic location is substantially similar to the predicted geographic location. For example, the image capture device 102 of the electronic device 100 may be alter at least one of a focal length setting, aperture setting, exposure setting, zoom setting, flash setting, white balance setting, resolution setting, file size setting, filter setting, shutter speed setting, a preset setting using the recommended image capture setting for the predicted geographic location, and/or the like.

The method of FIG. 6 includes capturing 608 an image using the recommended image capture setting. In the example of a user of the electronic device 100 traveling to the Eiffel Tower, the image capture device 102 may be configured to capture images using the recommended image capture setting once the user of the electronic device 100 arrives or is close to arriving at the Eiffel Tower.

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
at a first electronic device configured to capture an image:
communicating, to a social network server, an image capture setting request comprising a geographic location and an image capture feature set of the first electronic device;
receiving a response from the social network server comprising a ranking of a plurality of recommended image capture settings based on the image capture feature set of the first electronic device and the geographic location, each recommended image capture setting of the plurality of image capture settings comprising metadata associated with capture of a first image at the geographic location by a second electronic device;
receiving a selection of a recommended image capture setting from among the ranked plurality of recommended image capture settings; and
in response to receiving the selection of the recommended image capture setting, configuring the first electronic device to capture a second image based on the selected recommended image capture setting.

2. The method of claim 1, further comprising determining the image capture feature set of the first electronic device.

3. The method of claim 1, wherein the ranking is based on user feedback associated with each of the plurality of recommended image capture settings.

4. The method of claim 1, wherein the recommended image capture setting comprises at least one of a focal length setting, aperture setting, exposure setting, zoom setting, flash setting, white balance setting, resolution setting, file size setting, filter setting, shutter speed setting, and a preset setting.

5. The method of claim 1, further comprising capturing the second image using the selected recommended image capture setting.

6. A method comprising:
at a first electronic device configured to capture an image:
predicting a geographic location of the electronic device;
communicating, to a social network server, an image capture setting request comprising the predicted geographic location and an image capture feature set of the first electronic device;
receiving a response from the social network server comprising a ranking of a plurality of recommended image capture settings based on the image capture feature set of the first electronic device and the predicted geographic location, each recommended image capture setting of the plurality of image capture settings comprising metadata associated with capture of a first image at the predicted geographic location by a second electronic device;
receiving a selection of a recommended image capture setting from among the ranked plurality of recommended image capture settings;
determining whether a current geographic location of the first electronic device is substantially similar to the predicted geographic location; and
in response to determining the current geographic location is substantially similar to the predicted geographic location, configuring the electronic device to capture an image using the selected recommended image capture setting.

7. The method of claim 6, wherein predicting a geographic location comprises determining a geographic location associated with at least one of an entry of a calendar application and a destination of a navigation application.

8. The method of claim 7, wherein predicting a geographic location comprises associating the determined geographic location with the predicted geographic location.

9. The method of claim 6, further comprising determining the image capture feature set of the first electronic device.

10. The method of claim 6, wherein the ranking is based on at least one of a user feedback associated with each of the plurality of recommended image capture settings and the determined feature set of the electronic device.

11. The method of claim 6, wherein the recommended image capture setting comprises at least one of a focal length setting, aperture setting, exposure setting, zoom setting, flash setting, white balance setting, resolution setting, file size setting, filter setting, shutter speed setting, and a preset setting.

12. The method of claim 6, further comprising capturing an image using the selected recommended image capture setting.

* * * * *